United States Patent
Kanaya et al.

(10) Patent No.: US 7,564,745 B2
(45) Date of Patent: Jul. 21, 2009

(54) OPTICAL PICKUP AND OPTICAL DISK APPARATUS

(75) Inventors: Midori Kanaya, Tokyo (JP); Katsutoshi Sato, Tokyo (JP); Kenji Yamamoto, Kanagawa (JP); Noriaki Nishi, Kanagawa (JP); Noriyuki Mori, Tokyo (JP)

(73) Assignee: Sony Corporation, Tokyo (JP)

( * ) Notice: Subject to any disclaimer, the term of this patent is extended or adjusted under 35 U.S.C. 154(b) by 654 days.

(21) Appl. No.: 11/230,675

(22) Filed: Sep. 21, 2005

(65) Prior Publication Data

US 2006/0077784 A1 Apr. 13, 2006

(30) Foreign Application Priority Data

Sep. 22, 2004 (JP) ............... 2004-274604
Nov. 5, 2004 (JP) ............... 2004-322338

(51) Int. Cl.
*G11B 7/00* (2006.01)
(52) U.S. Cl. ............... 369/44.14; 369/44.11; 369/44.26; 369/112.24; 369/112.17
(58) Field of Classification Search ............... None
See application file for complete search history.

(56) References Cited

U.S. PATENT DOCUMENTS 6,747,938 B2 * 6/2004 Kim ............... 369/112.23
6,778,472 B2 * 8/2004 Nishikawa ............... 369/44.21
2004/0090901 A1 * 5/2004 Katayama ............... 369/112.24
2005/0007906 A1 * 1/2005 Horinouchi et al. ...... 369/44.37

FOREIGN PATENT DOCUMENTS

JP 2000-298869 10/2000

* cited by examiner

*Primary Examiner*—Wayne R Young
*Assistant Examiner*—Adam R Giesy
(74) *Attorney, Agent, or Firm*—Oblon, Spivak, McClelland, Maier & Neustadt, P.C.

(57) ABSTRACT

An optical pickup includes a first optical system for collecting first laser light emitted from a first laser light source onto a first disk, and guiding reflected light from the first disk to a photoreceptor; a second optical system for collecting second laser light emitted from a second laser light source onto a second disk, and guiding reflected light from the second disk to a photoreceptor; a second objective lens for collecting the second laser light onto the second disk and receiving the reflected light from the second disk, the second objective lens being movable in a radial direction passing through the center of the second disk, and a first objective lens for collecting the first laser light onto the first disk and receiving the reflected light from the first disk, the first objective lens being disposed offset from the radial direction and adjacently to the second objective lens.

15 Claims, 9 Drawing Sheets

——— ANGLE OF MAIN AND SIDE BEAMS
· · · · · · · TANGENT TO DISK

OPTICAL PICKUP AND OPTICAL DISK APPARATUS

CROSS REFERENCES TO RELATED APPLICATIONS

The present invention contains subject matter related to Japanese Patent Application JP 2004-274604 filed in the Japanese Patent Office on Sep. 22, 2004 and JP 2004-322338 filed in the Japanese Patent Office on Nov. 5, 2004, the entire contents of which are incorporated herein by reference.

BACKGROUND OF THE INVENTION

1. Field of the Invention

The present invention relates to an optical pickup and an optical disk apparatus that can perform recording or playback of three types of disks, namely, a CD (compact disk), a DVD (digital versatile disk), and a next-generation optical disk such as a Blu-ray Disc (hereinafter abbreviated as a "BD") which is a registered trademark). More particularly, the present invention relates to the arrangement of a CD/DVD objective lens and a BD objective lens.

2. Description of the Related Art

In recent years, CDs and DVDs on and from which image information and music information are recorded and played back have become widespread. In order to satisfy a demand to further increase the recording density and capacity, next-generation optical disks, for example, Blu-ray Discs that use laser light having a wavelength of 407 nm in the blue wavelength region, have been introduced.

Correspondingly, optical disk apparatuses that perform recording and playback of these disks have been developed and commercialized. The optical disk-apparatuses include two optical pickups, that is, an optical pickup for both CDs and DVDs and an optical pickup only for BDs, or a single optical pickup that can perform recording and/or playback of CDs, DVDs, and BDs. From the viewpoint of space, it is extremely natural to mount a single optical pickup that can perform recording and/or playback of CDs, DVDs, and BDs. Such an optical pickup is disclosed in, for example, Japanese Unexamined Patent Application Publication No. 2003-323735.

When recording or playback of CDs, DVDs, and BDs are performed with a single optical pickup, it is necessary to reduce the size and weight of the pickup and to respond to the increase of recording speed. Correspondingly, an objective lens for both CDs and DVDs and an objective lens only for BDs need to be arranged to apply laser light onto an optical disk and to receive reflected light from the optical disk.

SUMMARY OF THE INVENTION

Figure 4A:
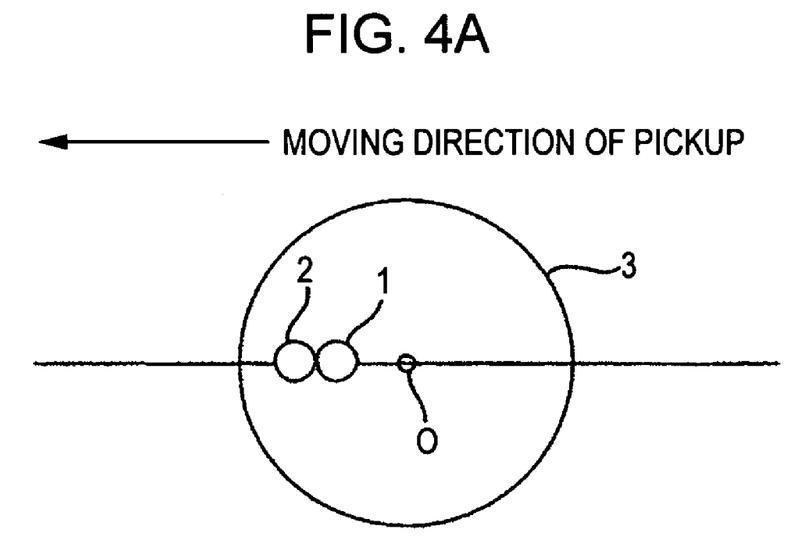
FIGS. 4A and 4B are explanatory views showing how to arrange two objective lenses.

In general, an objective lens disposed adjacent to an optical disk moves in the radial direction of the optical disk with the movement of an optical pickup in the radial direction, and accesses an arbitrary address on the rotating optical disk to record or play back data. For this reason, in a case in which a CD/DVD objective lens 1 and a BD objective lens 2 are arranged side by side in one optical pickup so that the moving directions thereof coincide with the radial direction of an optical disk 3, as shown in FIG. 4A, when the optical pickup moves to the innermost periphery of the optical disk 3, the objective lens 2 disposed on the outer side cannot access recording data or a recording region on the innermost periphery.

Figure 4B:
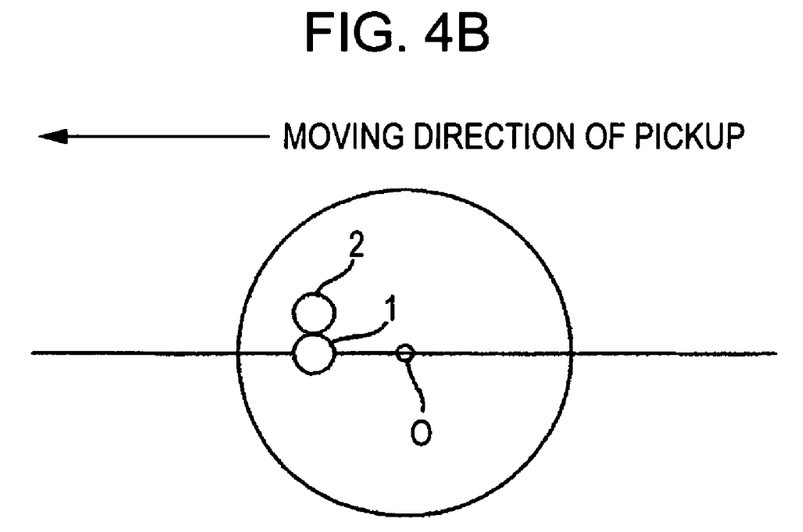

When the CD/DVD objective lens 1 is disposed on the radius of the optical disk 3, as before, and the BD objective lens 2 is disposed beside the objective lens 1 in the direction orthogonal to the radial direction of the optical disk 3, as shown in FIG. 4B, both of the objective lenses 1 and 2 can access recording data or a recording region on the innermost periphery of the optical disk 3. However, since the BD objective lens 2 is disposed slightly offset from the radius of the optical disk 3, that is, is out of the optimum position, even when the optical pickup is placed at a desired track position by a differential push pull (DPP) or three-beam tracking servo method, a large difference in amplitude of signals obtained by receiving reflected side beams is made between the inner periphery and the outer periphery of the optical disk 3. Finally, the accuracy of DPP or three-beam tracking servo control decreases, or tracking servo control becomes impossible.

In view of the above-described circumstances, it is desirable to provide an optical pickup that allows normal tracking servo control during recording or playback of a DVD, a CD, and a BD, that can access a recording or playback region on the innermost periphery of each of the optical disks, and that can smoothly record or play back signals on or from the disks, and to provide an optical disk apparatus using the optical pickup.

The wavelength of laser light used for a CD is 780 nm, and the wavelength of laser light used for a DVD is 650 nm. Both of the wavelengths are relatively close to each other. Therefore, an optical disk drive for both a CD and a DVD uses a common optical path, including an objective lens and a collimator lens, for CD laser light and DVD laser light, thereby reducing the total size of the drive. This technique is disclosed in, for example, Japanese Unexamined Patent Application Publication No. 2002-298869.

Blu-ray Discs (BDs) using blue-violet laser light having a wavelength of 405 nm have recently been put into practical use. Since BDs utilize laser light having a wavelength markedly shorter than in other known optical disks, they have a recording capacity several times as large as that of DVDs having the same diameter. Optical disk drives that are adapted for three wavelengths and that can use BDs as well as CDs and DVDs have also been put into practical use. However, the wavelength of laser light for BDs is 405 nm, as described above, and is significantly different from the wavelengths of laser light for CDs and DVDs. Therefore, it is difficult to design an objective lens common to three wavelengths. For this reason, in optical disk drives adapted for three wavelengths, it is realistic to mount two objective lenses, namely, a BD objective lens and a CD/DVD objective lens, in an optical pickup.

When a BD optical path and a CD/DVD optical path are completely separate from each other, the design of the optical pickup can be facilitated, but the size of the optical pickup increases. Accordingly, in a three-wavelength optical pickup, it is conceivable to mount two objective lens, namely, a BD objective lens and a CD/DVD objective lens, on one two-axis actuator so that laser light supplied from the BD optical path and laser light supplied from the CD/DVD optical path enter the corresponding objective lenses.

In this case, two raising mirrors for guiding laser light to the objective lenses are necessary for a BD and for a CD/DVD. In actuality, however, the two-axis actuator has a complicated structure including a lens support mechanism and a driving coil, and therefore, the range in which laser light enters the two-axis actuator is limited. In particular, the total thickness of a thin optical disk drive to be mounted in a notebook personal computer (so-called slim drive) is limited, and the entry range of laser light is further limited. Consequently, it is difficult to reduce the thickness of the optical pickup itself.

In view of the above-described problems, it is desirable to propose an optical pickup and an optical disk drive having a thin structure and adapted for a plurality of wavelengths.

An optical pickup according to an embodiment of the present invention includes a first optical system that collects first laser light emitted from a first laser light source onto a first disk and that receives and guides reflected light from the first disk to a first photoreceptor; a second optical system that collects second laser light emitted from a second laser light source onto a second disk and that receives and guides reflected light from the second disk to a second photoreceptor, the second laser light having a wavelength longer than the wavelength of the first laser light; a second objective lens for collecting the second laser light onto the second disk and for receiving the reflected light from the second disk, the second objective lens being movable in a radial direction passing through the center of the second disk; and a first objective lens for collecting the first laser light onto the first disk and for receiving and guiding the reflected light from the first disk, the first objective lens being disposed offset from the radial direction and adjacently to the second objective lens.

Preferably, tracking servo control is executed by a DPP method or a three-beam method during recording or playback of the second disk, and is executed by any one of a one-beam method, a phase-shift DPP method, and a 5-spot DPP method during recording or playback of the first disk.

According to this embodiment, a CD/DVD objective lens serving as the second objective lens is disposed so that the moving direction thereof coincides with the radial direction of an optical disk (CD or DVD) passing through the center of the rotation axis of the spindle motor or the center of the optical disk, and a BD objective lens serving as the first objective lens is disposed offset from the moving direction of the CD/DVD objective lens. Therefore, the distances from the rotation center of the optical disk to the CD/DVD objective lens and the BD objective lens are made almost the same, and both of the objective lenses can access a recording/playback region on the innermost periphery of the optical disk. Furthermore, since the moving direction of the CD/DVD objective lens coincides with the radial direction of the optical disk (CD or DVD), it is possible to avoid a problem in that the accuracy of DPP or three-beam tracking servo control decreases or tracking servo control becomes impossible because a large difference in amplitude of signals, which are obtained by receiving reflected side beams, is made between the inner periphery and the outer periphery of the optical disk.

Regarding signals obtained by reflected light from the BD objective lens, the above-described problem can be avoided by performing tracking servo control using any one of a one-beam method, a phase shift DPP method, and a 5-spot DPP method. This makes it possible to perform normal tracking servo control during recording or playback of any of a DVD, a CD, and a BD, and to access a recording/playback region on the innermost periphery of any disk. Accordingly, signals can be smoothly recorded on or played back from any disk.

The CD/DVD objective lens is placed so that the moving direction thereof coincides with the radial direction of an optical disk (CD or DVD), and the BD objective lens is placed offset from the line of the moving direction of the CD/DVD objective lens. Therefore, it is possible, regardless of the type of the optical disk, to reduce the influence of the problem in that a large difference in amplitude of a tracking error signal is made between the inner periphery and the outer periphery of the optical disk, to perform normal tracking servo control during recording or playback of any type of disk, and to access a recording/playback region on the innermost periphery of each optical disk. This allows signals to be smoothly recorded on and reproduced from any of the disks.

An optical pickup according to another embodiment of the present invention includes a first laser light source for emitting first laser light; a first objective lens provided correspondingly to the wavelength of the first laser light to direct the first laser light toward a first optical disk; a second laser light source for emitting second laser light having a wavelength different from the wavelength of the first laser light; a second objective lens provided correspondingly to the wavelength of the second laser light to direct the second laser light toward a second optical disk; a first optical path for guiding the first laser light from the first laser light source to the first objective lens; a second optical path for guiding the second laser light from the second laser light source to the second objective lens; an optical-path combiner for partly combining the first and second optical paths; and an optical-path separator for separating the first and second optical paths combined by the optical-path combiner before the combined optical paths reach the first and second objective lenses.

Preferably, the first and second objective lenses are provided in the same two-axis actuator, and the optical-path combiner combines the first and second optical paths before the first laser light and the second laser light enter the two-axis actuator.

Since the first and second optical paths are combined before the two-axis actuator, and are separated before the first and second objective lenses, it is possible to construct a thin optical pickup and an optical disk drive adapted for a plurality of wavelengths and including a thin two-axis actuator in which the entry range of laser light is limited.

DESCRIPTION OF THE PREFERRED EMBODIMENTS

In order to execute normal tracking servo control during recording or playback of any of a DVD, a CD, and a BD, to access a recording/playback region on the innermost periphery of each of the optical disks, and to smoothly record or reproduce signals on or from the disks, a CD/DVD objective lens is placed so that the moving direction thereof coincides with the radial direction of an optical disk (CD or DVD), and a BD objective lens is placed offset from the CD/DVD objective lens on a line extending perpendicularly to the moving direction of the CD/DVD objective lens.

An embodiment of the present invention will be described in detail below with reference to the drawings.

(1) Overall Configuration of Optical Disk Drive

Figure 7:
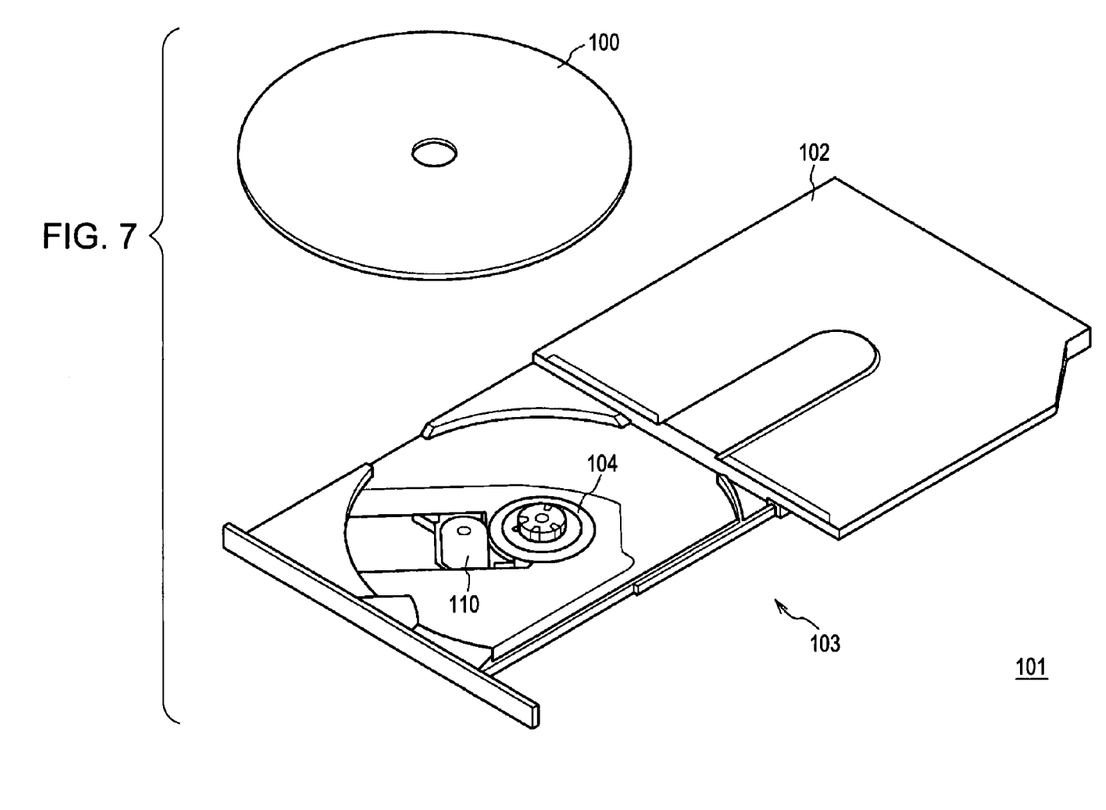
FIG. 7 is a schematic perspective view showing the overall configuration of an optical disk drive according to a further embodiment of the present invention.

FIG. 7 shows an optical disk drive 101 to which the present invention is applied, in which a disk tray 103 is movably attached to a box-shaped housing 102 so as to be loaded in and unloaded from the housing 102. The disk tray 103 includes a chuck 104 on which an optical disk 100 is mounted, a spindle motor (not shown) for rotating the optical disk 100 via the chuck 4, an optical pickup 110 that applies laser light onto a recording surface of the optical disk 100 and receives reflected light therefrom, and a sled mechanism (not shown) that reciprocates the entire optical pickup 110 in the radial direction of the optical disk 100.

The optical disk drive 101 is adapted for three wavelengths, and performs recording or playback of three types of optical disks, namely, a CD, a DVD, and a Blu-ray Disc. The optical disk drive 101 is a thin disk drive called a slim drive, and therefore, can be mounted in, for example, a notebook personal computer having a housing with a limited thickness.

(2) Configuration of Optical Pickup

Figure 8:
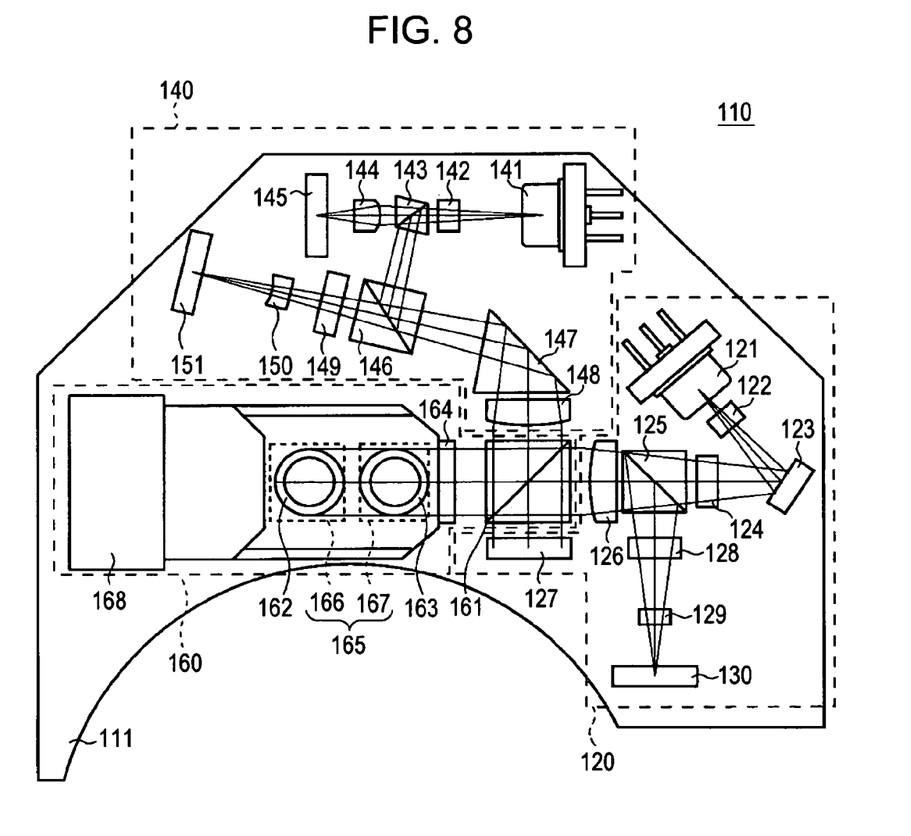
FIG. 8 is a schematic view showing the configuration of an optical pickup provided in the optical disk drive.

FIG. 8 shows the optical pickup 110 adapted for three wavelengths, in which various optical elements are mounted on a base 111. An optical system of the optical pickup 110 includes a CD/DVD optical system 120 for recording or playback of a CD and a DVD, a BD optical system 140 for recording and playback of a BD, and a common optical system 160 commonly used for three types of optical disks, a CD, a DVD, and a BD.

(2-1) Structure of CD/DVD Optical System

In the CD/DVD optical system 120, laser light is emitted as CD/DVD emitted light serving as first laser light from a CD/DVD laser diode 121 serving as a first laser light source, sequentially passes through a coupling lens 122, a mirror 123, a grating 124, and a beam splitter 125, and enters a collimator lens 126. The collimator lens 126 converts the CD/DVD emitted light into parallel light, and introduces the light into the common optical system 160.

An optical-path combining beam splitter 161 in the common optical system 160 perpendicularly reflects a part of the CD/DVD emitted light, and introduces the light into a front photodiode 127 for laser power detection. Although will be in detail below, the common optical system 160 applies the other part of the CD/DVD emitted light onto a recording surface of the optical disk 100 via a CD/DVD objective lens 162, receives reflected light from the recording surface, which serves as CD/DVD incident light, by the CD/DVD objective lens 162, and introduces the reflected light into the CD/DVD optical system 120.

In the CD/DVD optical system 120, the CD/DVD incident light enters the beam splitter 125 via the collimator lens 126. The beam splitter 125 perpendicularly reflects the CD/DVD incident light, and introduces the light into a detection PDIC (photodetector IC) 130 via a cylindrical lens 128 and a hologram element 129. The PDIC 130 photoelectrically converts the CD/DVD incident light, and outputs various signals such as a playback signal, a tracking error signal, and a focus error signal.

(2-2) Structure of BD Optical System

In the BD optical system 140, laser light is emitted as BD emitted light serving as second laser light from a BD laser diode 141 serving as a second laser light source, and enters a beam splitter 143 after the plane of polarization thereof is turned by a polarizer 142 such as a wavelength plate, a grating, or a combination of the elements.

The beam splitter 143 transmits a part of the BD emitted light, and introduces the part into a front photodiode 145 for laser power detection via a collimator lens 144. The beam splitter 143 reflects the other part of the BD emitted light, and introduces the part into a collimator lens 148 via a beam splitter 146 and a mirror 147. The collimator lens 148 converts the BD emitted light into parallel light, and introduces the light into the common optical system 160.

The optical-path combining beam splitter 161 in the common optical system 160 perpendicularly reflects the BD emitted light, and applies the light onto the recording surface of the optical disk 100 via a BD objective lens 163. The optical-path combining beam splitter 161 also receives reflected light from the recording surface as BD incident light by the BD objective lens 163, and introduces the light into the BD optical system 140.

In the BD optical system 140, the BD incident light enters the beam splitter 146 via the collimator lens 148 and the mirror 147. The beam splitter 146 transmits the BD incident light, and introduces the light into a detection PDIC 151 via a hologram element 149 and a coupling lens 150. The PDIC 151 photoelectrically converts the BD incident light, and outputs various signals such as a playback signal, a tracking error signal, and a focus error signal.

(2-3) Structure of Common Optical System

A detailed description will now be given of the structure of the common optical system 160 that characterizes the present invention. In the common optical system 160, the CD/DVD objective lens 162 and the BD objective lens 163 are mounted on the same two-axis actuator 168, and a raising mirror unit 165 composed of a BD raising mirror 166 and a CD/DVD raising mirror 167 is provided below the CD/DVD objective lens 162 and the BD objective lens 163.

Figure 9:
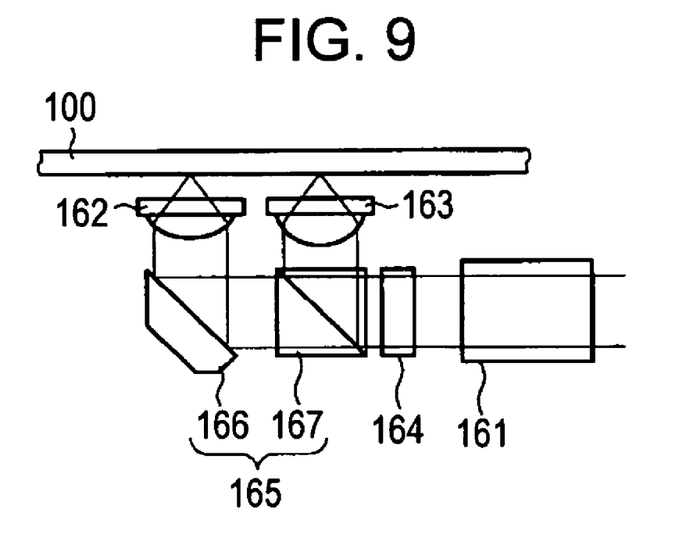
FIG. 9 is a schematic view showing an example of an arrangement manner of components in the optical pickup.

That is, as shown in FIG. 9, the CD/DVD raising mirror 166 is disposed below the CD/DVD objective lens 162, and the BD raising mirror 167 is disposed below the BD objective lens 163. The optical-path combining beam splitter 161, the BD raising mirror 167, and the CD/DVD raising mirror 166 are arranged on a straight line.

As described above, both the CD/DVD emitted light and the BD emitted light enter the optical-path combining beam splitter 161 serving as an optical-path combiner in the common optical system 160. After passing through the optical-path combining beam splitter 161, the CD/DVD emitted light and the BD emitted light enter the BD raising mirror 167 serving as an optical-path separator via a liquid crystal element 164 for correcting spherical aberration.

The BD raising mirror 167 is formed of a wavelength-selecting beam splitter, and reflects only blue-violet laser light having a wavelength of 405 nm for a Blu-ray Disc by 90°. For this reason, when BD emitted light is incident, the BD raising mirror 167 reflects the BD emitted light upward, and applies the light onto the optical disk 100 (a Blu-ray Disc in this case) via the BD objective lens 163. The BD raising mirror 167 also receives reflected light from the BD via the BD objective lens 163, and introduces the light into the BD optical system 140 via the liquid crystal element 164 and the optical-path combining beam splitter 161.

In contrast, when CD/DVD emitted light is incident, the BD raising mirror 167 transmits and introduces the light into the CD/DVD raising mirror 166. The CD/DVD raising mirror 166 reflects the CD/DVD emitted light upward, and applies the light onto the optical disk 100 (CD or DVD in this case) via the CD/DVD objective lens 162. The CD/DVD raising mirror 166 receives reflected light from the CD or DVD via the CD/DVD objective lens 162, and introduces the light into the CD/DVD optical system 120 via the BD raising mirror 167, the liquid crystal element 164, and the optical-path combining beam splitter 161.

(3) Operation and Advantages

In the above-described configuration, the CD/DVD objective lens 162 and the BD objective lens 163 are mounted on the same two-axis actuator 168 in the optical pickup 110, and CD/DVD emitted light emitted from the CD/DVD optical system 120 and BD emitted light emitted from the BD optical system 140 both enter the raising mirror unit 165 via the optical-path combining beam splitter 161 in the common optical system 160. The CD/DVD emitted light and the BD emitted light are separated by the BD raising mirror 167 formed of a wavelength-selecting beam splitter, and are emitted via the corresponding objective lenses 162 and 163.

By thus combining the optical paths of the CD/DVD emitted light and the BD emitted light incident on the raising mirror unit 165 by the optical-path combining beam splitter 161, the CD/DVD emitted light and the BD emitted light travel in a common optical path toward the two-axis actuator 167 that holds the objective lenses 162 and 163. Consequently, the optical pickup 110 adapted for three wavelengths can use the thin two-axis actuator 167 with a limited laser-light entry range.

In the above-described configuration, the optical paths of the CD/DVD emitted light and the BD emitted light are partly combined by the optical-path combining beam splitter 161, and are separated in the raising mirror unit 165 so that the CD/DVD emitted light and the BD emitted light enter the corresponding objective lenses 162 and 163. Therefore, the thin optical pickup 110 adapted for three wavelengths can use the thin two-axis actuator 167 with a limited laser-light entry range. This allows the optical disk drive 101 adapted for a plurality of wavelengths to have a thin structure.

(4) Modifications

While the two CD/DVD and BD optical paths are partly combined by the optical-path combining beam splitter 161 in the above-described embodiment, the present invention is not limited to the embodiment. For example, three optical paths, namely, a CD optical path, a DVD optical path, and a BD optical path, may be separately provided, may be combined by an optical-path combining beam splitter, and may be guided to the raising mirror unit 165. The optical disk drive 101 is applicable not only to CDs, DVDs, and BDs, but also to various other optical disks.

Figure 10:
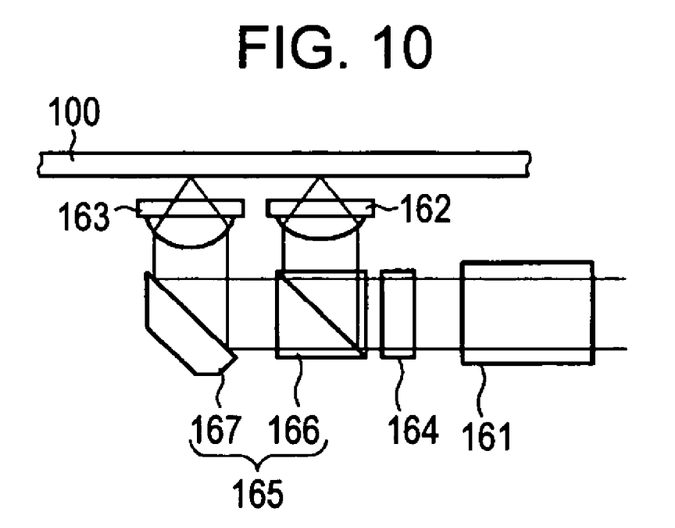
FIG. 10 is a schematic view showing another example of an arrangement manner of the components.

In the structure of the common optical system 160 shown in FIG. 9, places of the CD/DVD objective lens 162 and the BD objective lens 163 may be changed with each other, the CD/DVD raising mirror 166 may be disposed below the CD/DVD objective lens 162, and the BD raising mirror 167 may be disposed below the BD objective lens 163, as shown in FIG. 10. In this case, the optical-path combining beam splitter 161, the BD raising mirror 167, and the CD/DVD raising mirror 166 may also be arranged on a straight line.

That is, as shown in FIG. 10, the CD/DVD objective lens 162 and the BD objective lens 163 are arranged so that CD/DVD emitted light and BD emitted light both enter the CD/DVD raising mirror 166 serving as the optical-path separator after passing through the optical-path combining beam splitter 161.

The CD/DVD raising mirror 166 is formed of a wavelength-selecting beam splitter, and transmits blue-violet laser light having a wavelength of 405 nm for a Blu-ray Disc. For this reason, when BD emitted light is incident, the CD/DVD raising mirror 166 transmits the BD emitted light, and introduces the light to the BD raising mirror 167. The BD raising mirror 167 reflects the BD emitted light upward, applies the light onto the optical disk 100 (a BD in this case) via the BD objective lens 163, and introduces reflected light received from the BD via the BD objective lens 163 into the BD optical system 140 via the liquid crystal element 164 and the optical-path combining beam splitter 161.

In contrast, when CD/DVD emitted light is incident, the CD/DVD raising mirror 166 reflects the CD/DVD emitted light upward by 90°, and applies the light onto the optical disk 100 (CD or DVD) via the CD/DVD objective lens 162. The CD/DVD raising mirror 166 also receives reflected light from the CD or DVD via the CD/DVD objective lens 162, and introduces the light into the CD/DVD optical system 120 via the liquid crystal element 164 and the optical-path combining beam splitter 161.

In the structure shown in FIG. 10, when the BD objective lens 163 is made of a material heavier than the material of the CD/DVD objective lens 162, for example, when the BD objective lens 163 is made of glass and the CD/DVD objective lens 162 is made of plastic, the center of gravity of the actuator 168 is positioned near the fixed section. This improves the characteristics of the actuator 168.

Figure 1:
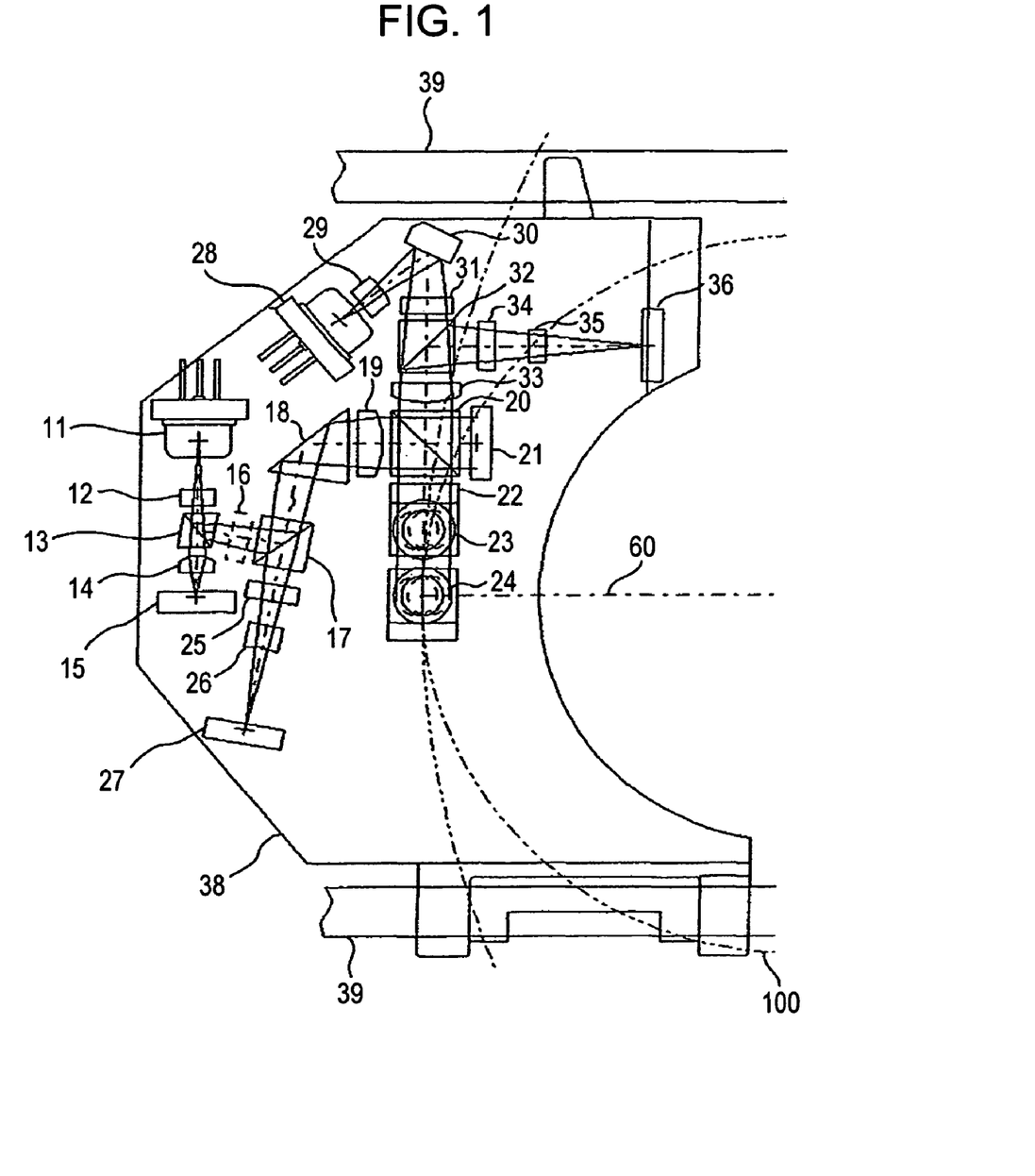
FIG. 1 is a schematic view showing the configuration of an optical pickup according to an embodiment of the present invention.

FIG. 1 is a schematic view showing the configuration of an optical pickup according to a second embodiment of the present invention. In the optical pickup of the second embodiment, laser light having a wavelength of 407 nm is emitted from a BD laser diode 11, and is collected onto a BD (not shown) through a half-wave plate 12, a beam splitter 13, a grating 16, a beam splitter 17, a mirror 18, a collimator lens 19, a three-wavelength beam splitter 20, a quarter-wave plate 22, and a BD objective lens 23. In this case, part of the laser light emitted from the BD laser diode 11 passes through the beam splitter 13, and is collected onto a front-monitor photodiode IC 15 by a condenser lens 14. Reflected light from the BD passes through the BD objective lens 23, the quarter-wave plate 22, the three-wavelength beam splitter 20, the collimator lens 19, the mirror 18, the beam splitter 17, and a hologram element (HOE) 25, and is collected onto a photodiode IC 27 by a multilens 26. The above components constitute an BD optical system mounted in the optical pickup of the second embodiment.

In the optical pickup, laser light having a wavelength of 780 nm or 650 nm for a CD or a DVD is emitted from a CD and/or DVD laser diode 28, and is collected onto a CD or a DVD (not shown) through a coupling lens 29, a mirror 30, a grating 31, a two-wavelength beam splitter 32, a collimator lens 33, the three-wavelength beam splitter 20, the quarter-wave plate 22, and a DVD/CD objective lens 24. In this case, part of the laser light emitted from the CD/DVD laser diode 28 is collected onto a front-monitor photodiode IC 21 after its optical path is turned 90° by the beam splitter 20. Reflected light from the CD or the DVD passes through the CD/DVD objective lens 24, the quarter-wave plate 22, the three-wavelength beam splitter 20, the collimator lens 33, the two-wavelength beam splitter 32, a cylindrical lens 34, and a hologram element (HOE) 35, and is collected onto a photodiode IC 36. The above components constitute a CD/DVD optical system mounted in the optical pickup of the second embodiment. The optical system includes the two-wavelength diode 28 for the CD and the DVD, and the laser diode 11 only for the BD. Therefore, recording or playback of the CD, the DVD, and the BD can be performed with the single optical pickup while switching among the optical paths by the three-wavelength beam splitter 20. The above-described optical system is contained in a housing 38 of the optical pickup. The housing 38 is movable in the radial direction of an optical disk 100 so as to slide along fixed shafts 39.

In order to perform recording or playback of a CD or a DVD, for example, in order to perform recording or playback of a CD (CD-R, CD-RW, CD-ROM), laser light of 780 nm for a CD is emitted from the laser diode 28. In order to perform recording or playback of a DVD (DVD-R, DVD-RW, DVD-RAM, DVD-ROM), laser light of 650 nm for a DVD is emitted from the laser diode 28. Each laser light is applied onto the CD or DVD through the above-described CD/DVD optical system. The laser diode 28 may be any of a one-wavelength diode only for CDs, a one-wavelength diode only for DVDs, and a two-wavelength laser diode for both CDs and DVDs.

Figure 2A:
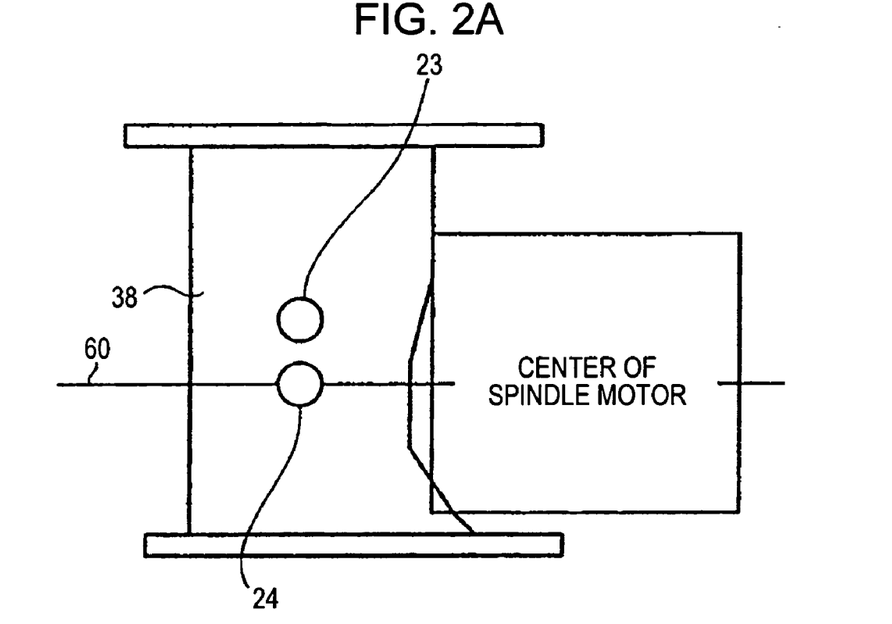
FIG. 2A is a schematic view showing an example of an arrangement manner of a CD/DVD objective lens and a DVD objective lens shown in FIG. 1.
Figure 2B:
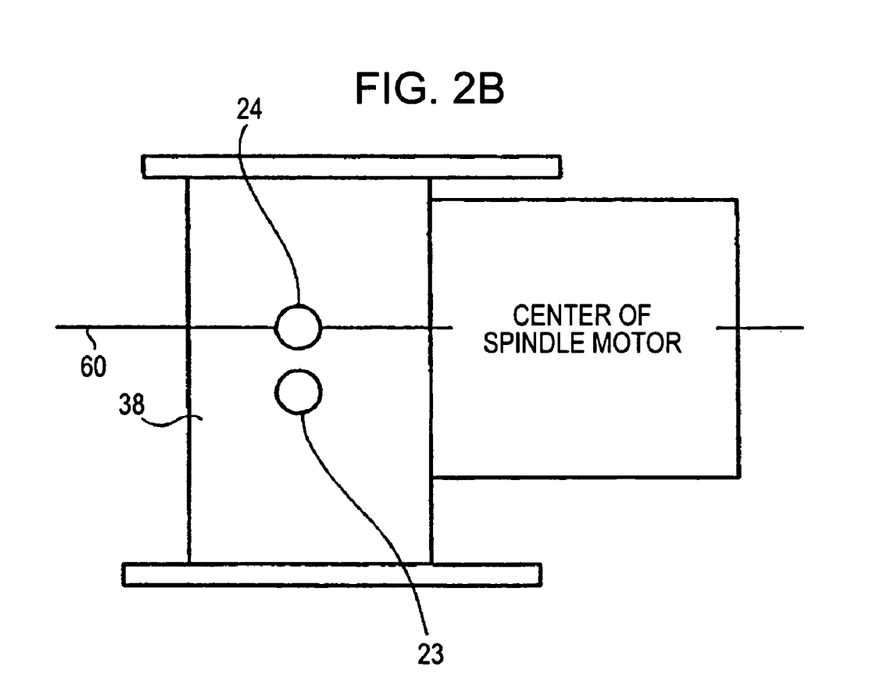
FIG. 2B is a schematic view showing another example of an arrangement manner of the CD/DVD objective lens and the DVD objective lens.

The housing 38 is movable in the horizontal direction in FIG. 1, as described above, and the optical disk 100 rotates. Therefore, the CD/DVD objective lens 24 or the BD objective lens 23 mounted in the optical pickup can access an arbitrary recording/playback region on the optical disk 100. For example, as shown in FIG. 2A, the CD/DVD objective lens 24 moves on a radius (a line passing through the center of a spindle motor that rotates the optical disk 100) 60 of the optical disk 100. Alternatively, places of the CD/DVD objective lens 24 and the BD objective lens 23 may be changed with each other, as shown in FIG. 2B.

The BD objective lens 23 is disposed beside the CD/DVD objective lens 24 in the direction orthogonal to the radius 60, and therefore, the moving direction thereof deviates from the radius 60. However, since the distances from the rotation axis of the optical disk 100 to the CD/DVD objective lens 24 and the BD objective lens 23 are almost the same, both the objective lenses can access a recording/playback region on the innermost periphery of the optical disk 100.

According to the second embodiment, since the CD/DVD objective lens 24 moves on the radius 60 of the optical disk 100, there is no influence on tracking servo control. For example, signals can be smoothly recorded on a DVD under precise tracking servo control by DPP. When a DVD-ROM is played back, tracking servo control can also be precisely executed by DPD (differential phase detection).

Figure 5:
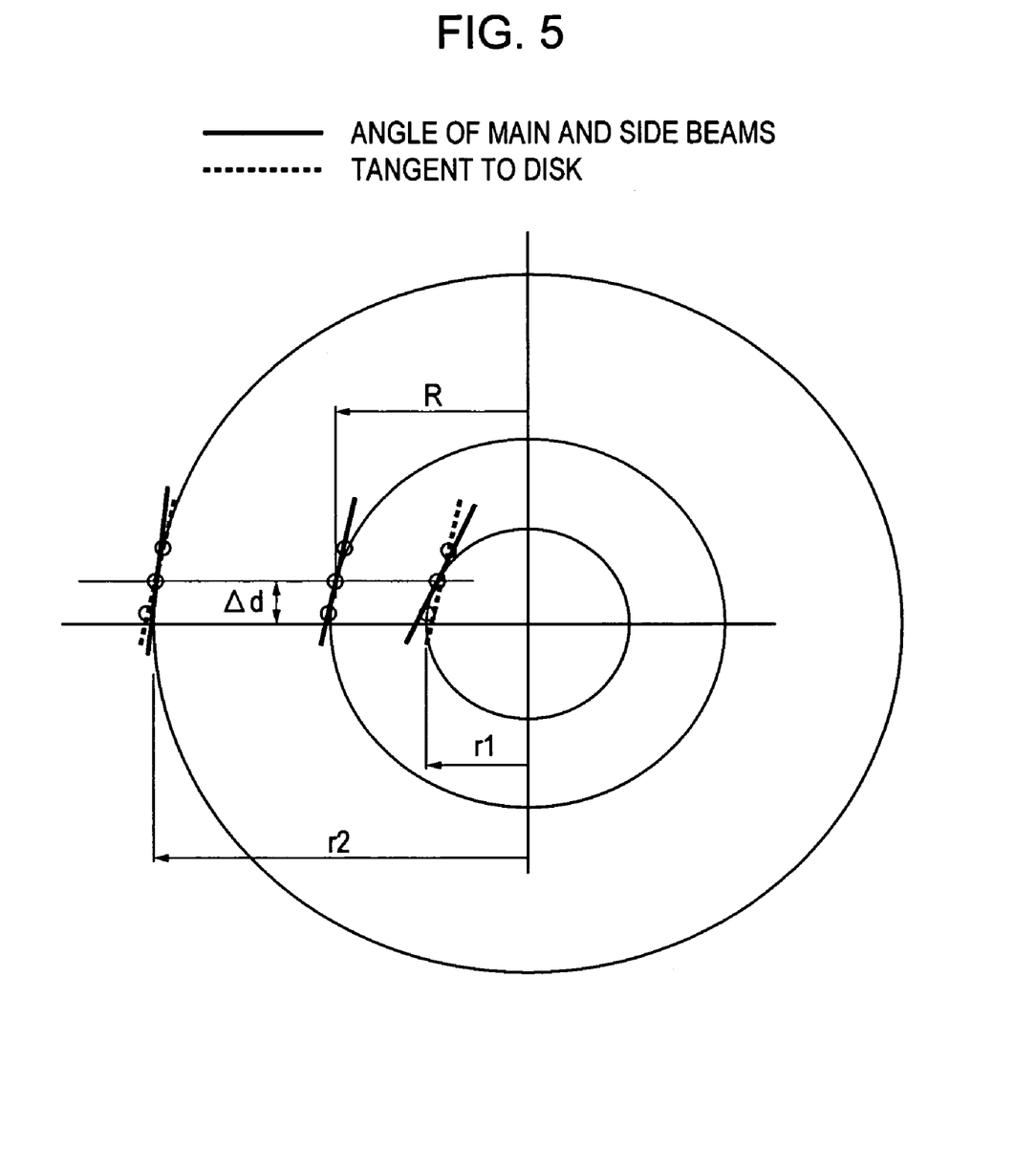
FIG. 5 is an explanatory view showing how to adjust a grating in a CD/DVD optical system.
Figure 6:
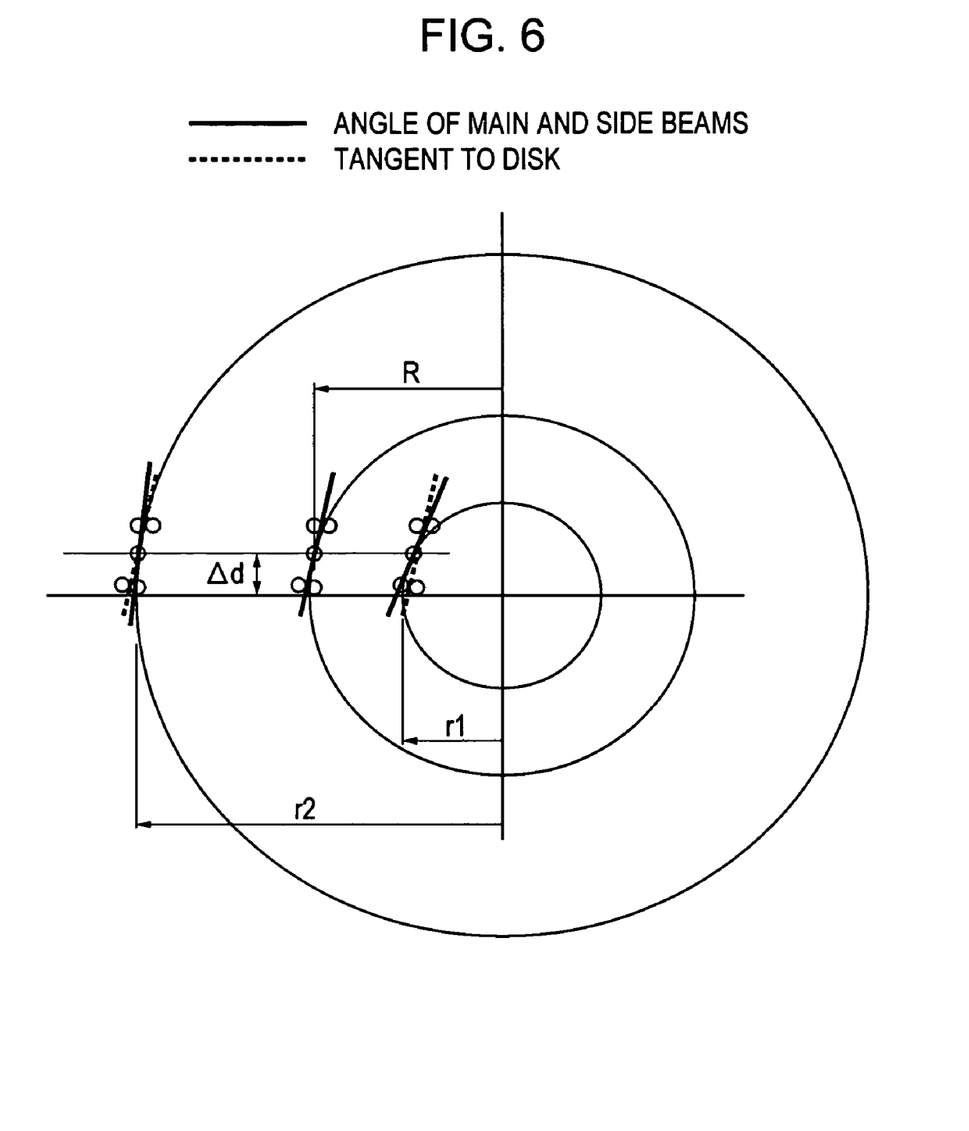
FIG. 6 is an explanatory view showing how to adjust a grating in a BD optical system.

In contrast, the moving direction of the BD objective lens 23 deviates from the radius 60 of the optical disk 100. Therefore, tracking servo failure may occur. Incidentally, a one-beam method as one of tracking servo methods originally uses only a main push-pull (MPP) signal, which is generated from reflected light from a main beam, as a tracking error signal, and tracking servo failure does not occur in this method. In a phase-shift DPP method, when the BD objective lens is placed offset by Ad from the radius 60 extending through the center of the optical disk, as shown in FIG. 5, a grating is adjusted so that a main beam and side beams are almost aligned along the tangent to a track on the optical disk at a position R ($=\Delta d*1/(\theta 1+\theta 2)/2$, $\theta 1=\tan^{-1}(\Delta d/r1)$, $\theta 2=\tan^{-1}(\Delta d/r2)$), wherein r1 represents the radius at the innermost periphery, and r2 represents the radius at the outermost periphery), for example, so that the angle formed between the beams and the tangent is within the range of approximately $\pm 1°$. This reduces modulation of signals obtained by the side beams to zero, and lessens the influence of amplitude variation of a tracking error signal in the radial direction of the optical disk. In a 5-spot DPP method, beams are applied, as shown in FIG. 6. In this case, the grating is adjusted similarly to the phase-shift DPP method.

Accordingly, the second embodiment adopts any of the one-beam method, the phase shift DPP method, and the 5-spot DPP method during recording or playback of BDs in order to avoid tracking servo failure. Consequently, smooth recording or playback of BDs is possible.

Figure 3:
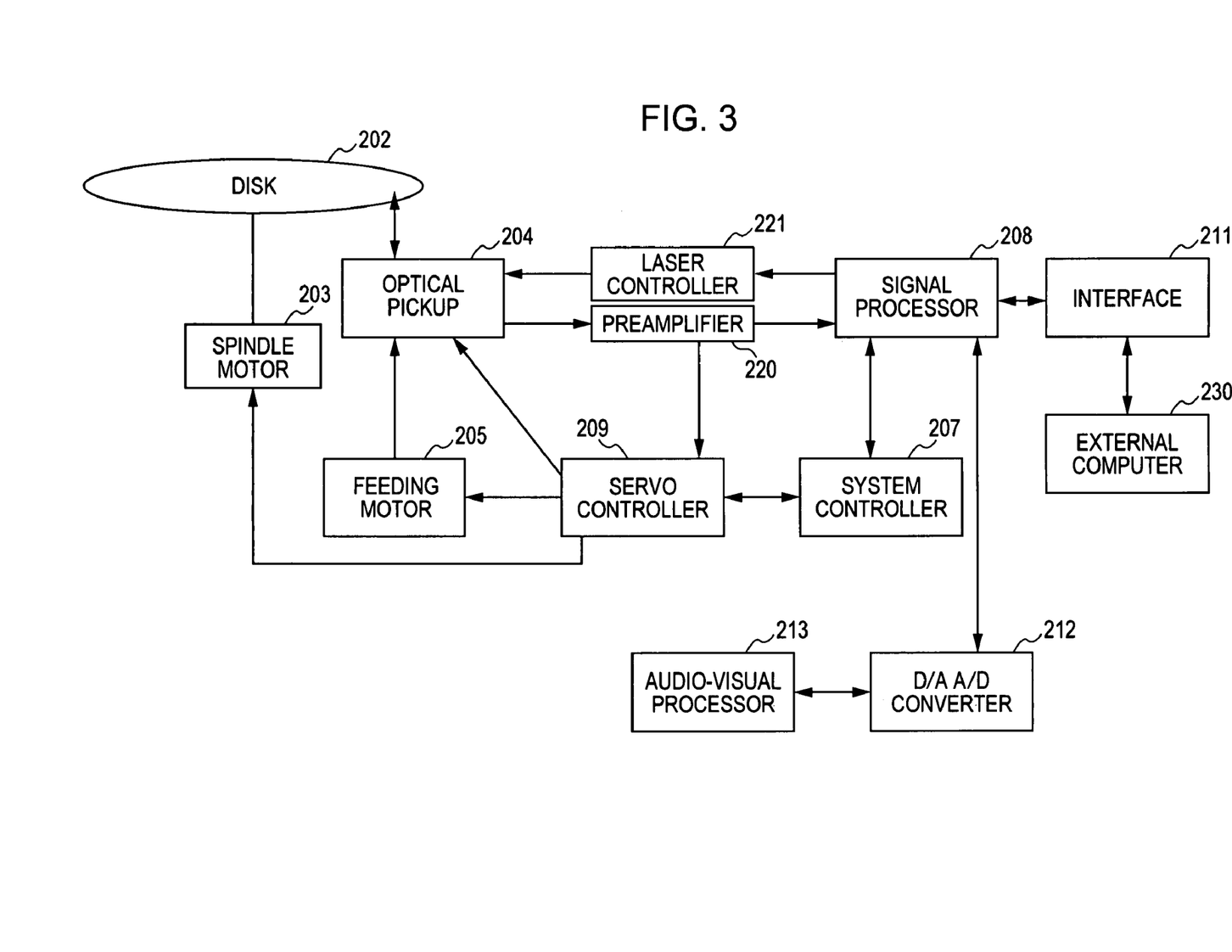
FIG. 3 is a block diagram showing the configuration of the principal part of an optical disk apparatus according to another embodiment of the present invention.

FIG. 3 is a block diagram showing the configuration of the principal part of an optical disk apparatus according to a third embodiment of the present invention. The optical disk apparatus accesses a disk 202, such as a DVD±R/RW, a CD-R/RW, or a BD, with an optical pickup 204 to record and play back data. The optical disk apparatus includes a spindle motor 203 serving as a driver for rotating the disk 202, the optical pickup 204 that reads and writes data from and on the disk 202, a feeding motor 205 serving as a driver for moving the optical pickup 204 in the radial direction of the disk 202, a system controller 207 that controls the entire apparatus, a signal processor 208 that performs predetermined processing, such as demodulation and error correction, according to a signal output from a preamplifier 220, a servo controller 209 that controls the spindle motor 203 and the feeding motor 205, the preamplifier 220 that generates, for example, a focus error signal, a tracking error signal, and an RF signal on the basis of various signals output from the optical pickup 204, an interface 211 that connects the signal processor 208 and an external computer 230, a laser controller 221 that drives laser light sources in the optical pickup 204, the external computer 230 that receives, as a playback signal, a signal recorded on the disk 202, modulates the signal by the signal processor 208, and outputs the signal to the laser controller 221 to drive the laser light sources in the optical pickup 204, a D/A A/D converter 212 that subjects a signal from the signal processor 208 to D/A conversion or subjects a signal from an audio-visual processor 213 to A/D conversion, and the audio-visual processor 213 that processes recorded or played-back audio and visual signals. The optical pickup 204 contains the optical system of the second embodiment shown in FIG. 1.

The feeding motor 205 is connected to the optical pickup 204, for example, in order to move the optical pickup 204 to a predetermined recording track on the disk 202. Control of the spindle motor 203, control of the feeding motor 205, and control in the focusing and tracking directions of a two-axis actuator that holds objective lenses in the optical pickup 204 are executed by the servo controller 209 according to a focus error signal and a tracking error signal input from the preamplifier 220. The laser controller 221 controls to change the output powers of laser diodes 11 and 28 in the optical pickup 204 in a recording mode and a playback mode.

According to the third embodiment, since the CD/DVD objective lens 24 moves on a line extending in the radial direction and passing through the center of the optical disk 100, tracking servo failure does not occur. For example, signals can be smoothly recorded on a DVD under precise tracking servo control by DPP. Since the moving direction of the BD objective lens 24 deviates from the radius 60 passing through the rotation axis of the optical disk 100, any of the tracking servo methods, namely, a one-beam method, a phase-shift DPP method, and a 5-spot DPP method, is adopted during recording or playback of the BD. This avoids tracking servo failure, and allows smooth recording or playback. In addition, since both of the objective lenses 23 and 24 are disposed at almost the same distance from the rotation axis of the optical disk 100, they can access a recording/playback region on the innermost periphery of the optical disk 100 of any type during recording or playback.

It should be understood by those skilled in the art that the present invention is not limited to the above embodiments, and that various modifications, combinations, sub-combinations and alterations may occur depending on design requirements and other factors insofar as they are within the scope of the appended claims or the equivalents thereof.

What is claimed is:

1. An optical pickup comprising:
    a first optical system configured to collect a first laser light emitted from a first laser light source onto a first disk and configured to receive and guide reflected light from the first disk to a first photoreceptor, the first laser light having a first wavelength;
    a second optical system configured to collect a second laser light emitted from a second laser light source onto a second disk and configured to receive and guide reflected light from the second disk to a second photoreceptor, the second laser light having a second wavelength that is longer than the first wavelength of the first laser light;
    a second objective lens configured to collect the second laser light onto the second disk and configured to receive the reflected light from the second disk, the second objective lens being movable in a radial direction passing through the center of the second disk;
    a first objective lens configured to collect the first laser light onto the first disk and configured to receive and guide the reflected light from the first disk, the first objective lens being disposed offset from the radial direction and adjacently to the second objective lens;
    an optical-path combiner that is positioned between the first and second light sources and the first and second objective lenses and that is configured to combine the first and second optical systems to form a combined optical path; and
    an optical-path separator that is positioned between the optical-path combiner and the first and second objective lenses and that is configured to separate the combined optical path before the combined optical path reaches the first and second objective lenses.

2. The optical pickup according to claim 1, wherein the first laser light source is provided for a Blu-ray Disc, the second laser light source is provided for a CD and/or a DVD, the first objective lens is provided for the Blu-ray Disc, and the second objective lens is provided for the CD and/or the DVD.

3. The optical pickup according to claim 1, wherein the first objective lens is disposed adjacently to the second objective lens in a direction orthogonal to a moving direction of the second objective lens.

4. The optical pickup according to claim 1, wherein the optical-path separator is a wavelength-selecting beam splitter that is configured to reflect one of the first laser light and the second laser light and that is configured to transmit the other of the first laser light and the second laser light.

5. The optical pickup according to claim 4, wherein the wavelength-selecting beam splitter is configured to reflect the first laser light and is configured to transmit the second laser light.

6. The optical pickup according to claim 4, wherein the wavelength-selecting beam splitter that is configured to reflect the second laser light and is configured to transmit the first laser light.

7. The optical pickup according to claim 1, wherein the first wavelength is 405 nm and the second wavelength is either 780 nm or 650 nm.

8. The optical pickup according to claim 1, wherein the first wavelength is 407 nm and the second wavelength is either 780 nm or 650 nm.

9. An optical disk apparatus, comprising:
    an optical pickup that includes:
        a first optical system configured to collect a first laser light emitted from a first laser light source onto a first disk and configured to receive and guide reflected light from the first disk to a first photoreceptor, the first laser light having a first wavelength;
        a second optical system configured to collect a second laser light emitted from a second laser light source onto a second disk and configured to receive and guide reflected light from the second disk to a second photoreceptor, the second laser light having a second wavelength longer than the first wavelength of the first laser light;
        a second objective lens configured to collect the second laser light onto the second disk and configured to receive the reflected light from the second disk, the second objective lens being movable in a radial direction passing through the center of the second disk;
        a first objective lens configured to collect the first laser light onto the first disk and configured to receive and guide the reflected light from the first disk to the first photoreceptor, the first objective lens being disposed offset from the radial direction and adjacently to the second objective lens;
        an optical-path combiner that is positioned between the first and second light sources and the first and second objective lenses and that is configured to combine the first and second optical systems to form a combined optical path; and
        an optical-path separator that is positioned between the optical-path combiner and the first and second objective lenses and that is configured to separate the combined optical path before the combined optical path reaches the first and second objective lenses.

10. The optical disk apparatus according to claim 9, wherein tracking servo control is executed by a differential push pull (DPP) method or a three-beam method during recording or playback of the second disk, and is executed by any one of a one-beam method, a phase-shift DPP method, and a 5-spot DPP method during recording or playback of the first disk.

11. The optical pickup according to claim 9, wherein the optical-path separator is a wavelength-selecting beam splitter that is configured to reflect one of the first laser light and the second laser light and that is configured to transmit the other of the first laser light and the second laser light.

12. The optical pickup according to claim 11, wherein the wavelength-selecting beam splitter is configured to reflect the first laser light and is configured to transmit the second laser light.

13. The optical pickup according to claim 11, wherein the wavelength-selecting beam splitter that is configured to reflect the second laser light and is configured to transmit the first laser light.

14. The optical pickup according to claim 9, wherein the first wavelength is 405 nm and the second wavelength is either 780 nm or 650 nm.

15. The optical pickup according to claim 9, wherein the first wavelength is 407 nm and the second wavelength is either 780 nm or 650 nm.

* * * * *